(12) United States Patent
Aida

(10) Patent No.: US 12,154,720 B2
(45) Date of Patent: Nov. 26, 2024

(54) CERAMIC ELECTRONIC COMPONENT, MOUNTING SUBSTRATE ARRANGEMENT, AND METHODS OF MANUFACTURING CERAMIC ELECTRONIC COMPONENT

(71) Applicant: TAIYO YUDEN CO., LTD., Tokyo (JP)

(72) Inventor: Shin Aida, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 103 days.

(21) Appl. No.: 17/830,256

(22) Filed: Jun. 1, 2022

(65) Prior Publication Data

US 2022/0399164 A1 Dec. 15, 2022

(30) Foreign Application Priority Data

Jun. 15, 2021 (JP) ................................ 2021-099609

(51) Int. Cl.
| | |
|---|---|
| *H01G 4/005* | (2006.01) |
| *H01G 2/02* | (2006.01) |
| *H01G 4/12* | (2006.01) |
| *H01G 4/30* | (2006.01) |

(52) U.S. Cl.
CPC ............... *H01G 4/005* (2013.01); *H01G 2/02* (2013.01); *H01G 4/30* (2013.01); *H01G 4/12* (2013.01)

(58) Field of Classification Search
CPC .......... H01G 4/30; H01G 4/232; H01G 4/248; H01G 4/005; H01G 2/02; H01G 4/12
USPC ........................ 361/301.4, 306.3, 321.3, 311
See application file for complete search history.

(56) References Cited

U.S. PATENT DOCUMENTS

| | | | |
|---|---|---|---|
| 2014/0177128 | A1 | 6/2014 | Kim |
| 2014/0233148 | A1* | 8/2014 | Jeon .................. H01G 4/12 427/79 |
| 2016/0049249 | A1* | 2/2016 | Mukobata .......... H01G 4/30 361/301.4 |
| 2017/0076865 | A1* | 3/2017 | Tanaka ............... H01G 4/232 |
| 2017/0244023 | A1* | 8/2017 | Kim .................. H10N 30/872 |
| 2017/0278631 | A1 | 9/2017 | Choi et al. |
| 2018/0226192 | A1 | 8/2018 | Choi et al. |

FOREIGN PATENT DOCUMENTS

| | | |
|---|---|---|
| JP | 2014-123694 A | 7/2014 |
| JP | 2017-175105 A | 9/2017 |

* cited by examiner

*Primary Examiner* — Arun Ramaswamy
(74) *Attorney, Agent, or Firm* — CHEN YOSHIMURA LLP

(57) ABSTRACT

A ceramic electronic component includes an element body including a first internal electrode, a second internal electrode disposed in parallel to the first internal electrode, and a dielectric interposed between the first and second internal electrodes and surrounding them, and external electrode electrically connected to ends of the internal electrodes. The element body has a bottom surface on which respective ends of the first and second internal electrodes are exposed and a top surface. The dielectric has bottom dielectric regions adjacent to the bottom surface, a top dielectric region adjacent to the top surface, and a middle height dielectric region disposed between the bottom and top dielectric region. The bottom dielectric regions have a ratio of the concentration of one or more group 14 elements to the concentration of one or more group 2 elements that is higher than that in the top dielectric region.

16 Claims, 11 Drawing Sheets

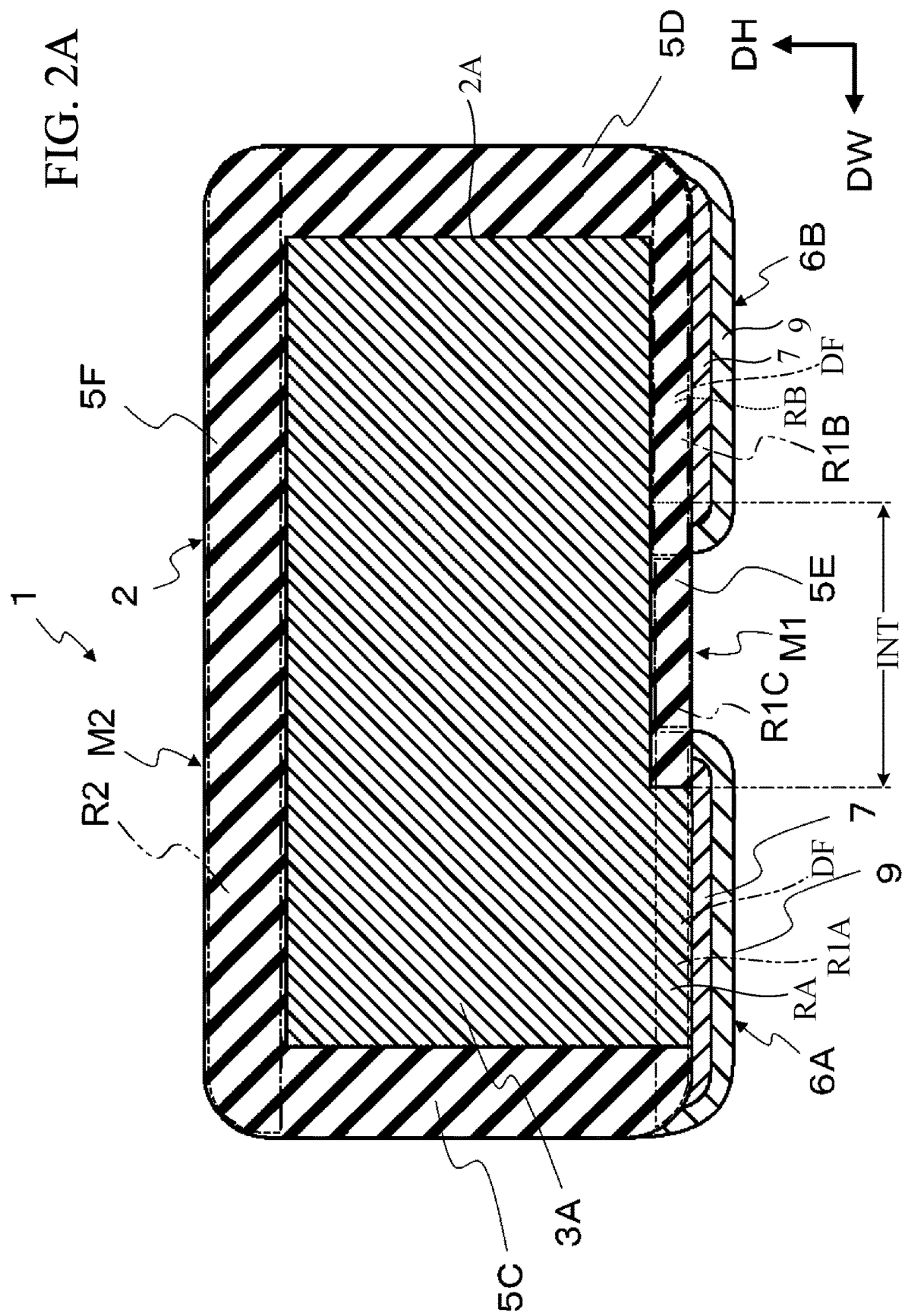

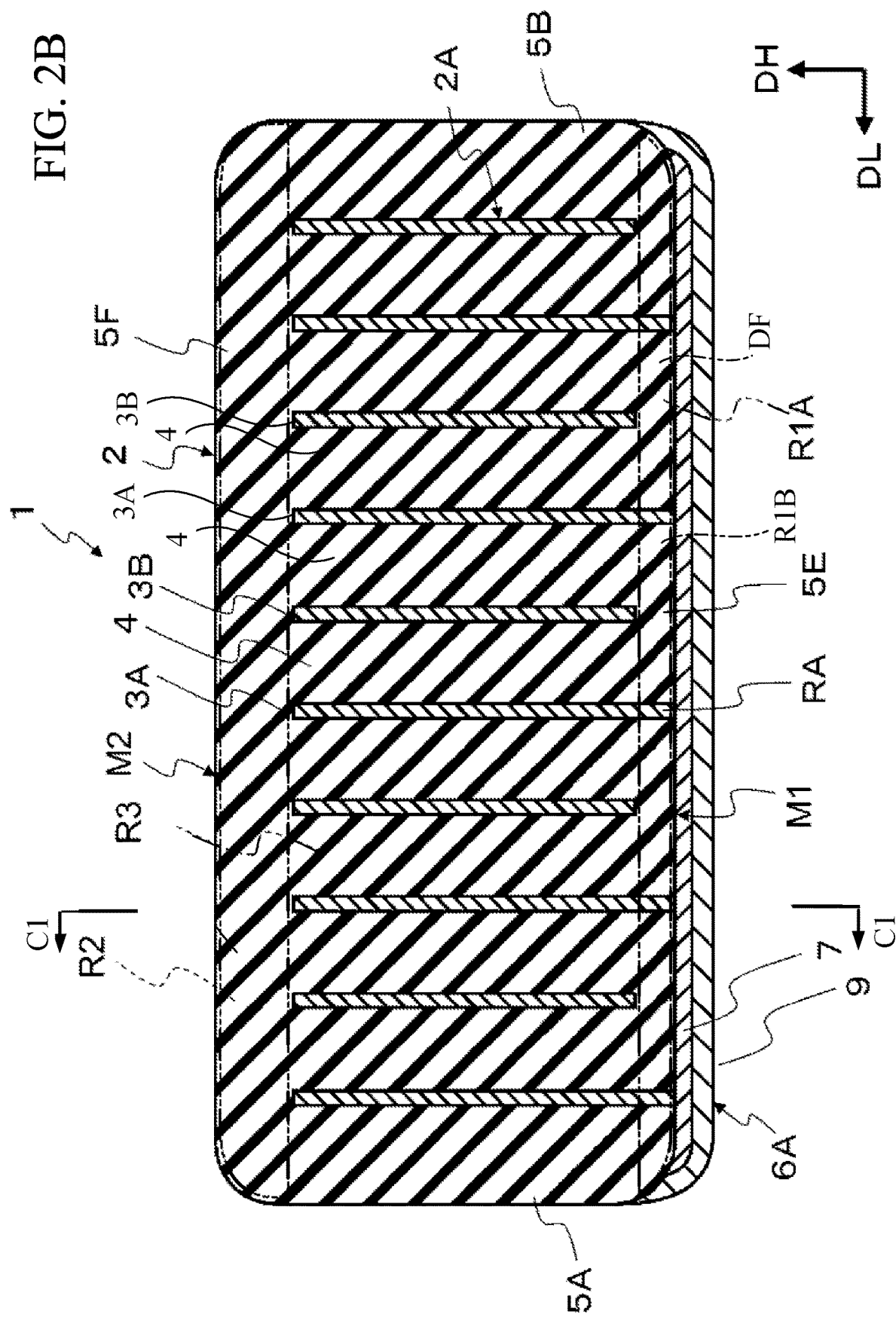

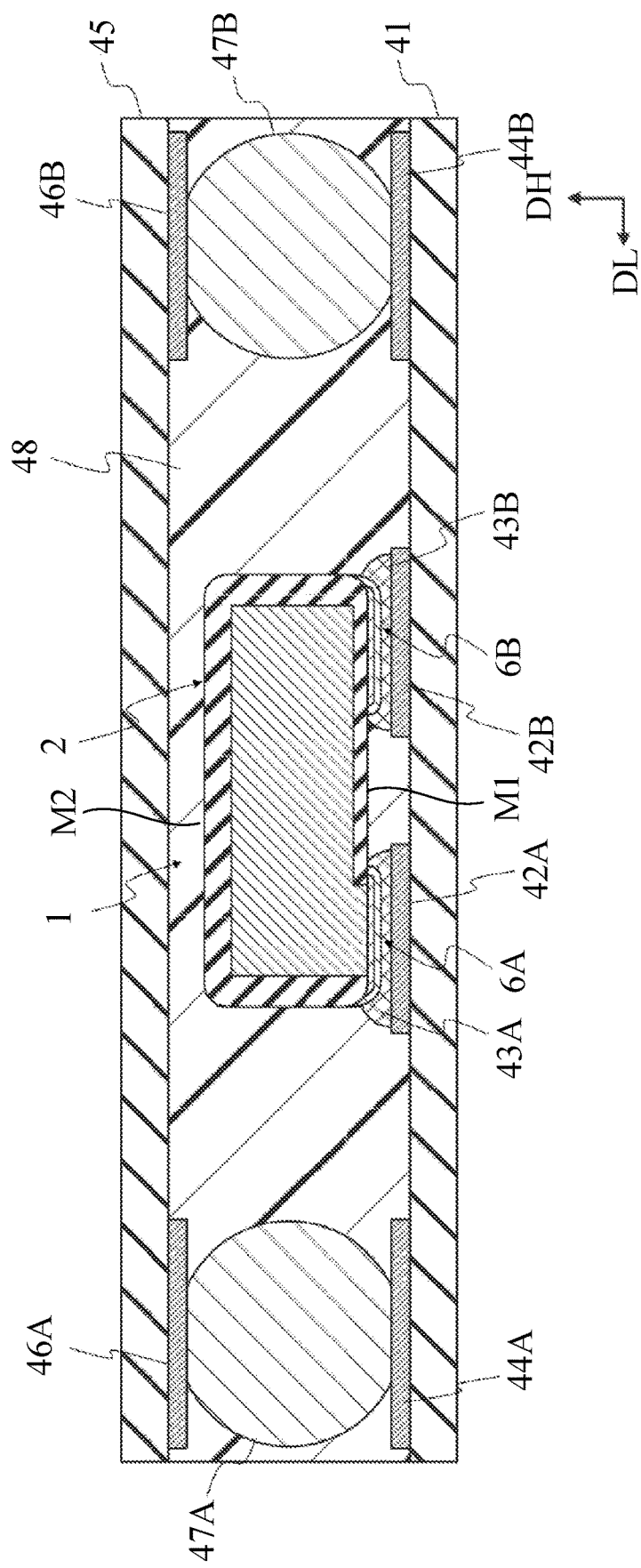

FIG. 7

| | RATIO OF ATOMIC CONCENTRATION OF SILICON TO THAT OF BARIUM IN REGIONS R1A AND R1B | RATIO OF ATOMIC CONCENTRATION OF SILICON TO THAT OF BARIUM IN REGION R2 | OCCURRENCE OF CORNER CHIPPING | OCCURRENCE OF PEELING OF EXTERNAL ELECTRODE | CAPACITANCE DENSITY ($\mu$F/mm$^3$) | GOOD OR BAD |
|---|---|---|---|---|---|---|
| SPECIMEN 1 | 1.0% | 1.0% | 0.0% | 0.1% | 19 | BAD |
| SPECIMEN 2 | 1.0% | 1.3% | 0.1% | 0.1% | 18 | BAD |
| SPECIMEN 3 | 1.3% | 1.3% | 0.1% | 0.0% | 17 | BAD |
| SPECIMEN 4 | 5.2% | 1.0% | 0.0% | 0.0% | 10 | BAD |
| SPECIMEN 5 | 1.3% | 1.0% | 0.0% | 0.0% | 18 | GOOD |
| SPECIMEN 6 | 3.9% | 1.0% | 0.0% | 0.0% | 17 | GOOD |

FIG. 8A

|  | J1A | J1B | J1C | AVERAGE |
|---|---|---|---|---|
| ATOMIC CONCENTRATION OF SILICON (Si) | 0.74 | 0.79 | 0.83 | 0.79 |
| ATOMIC CONCENTRATION OF BARIUM (Ba) | 60 | 59.95 | 60.63 | 60.19 |
| Si/Ba (%) | 1.23 | 1.32 | 1.37 | 1.31 |

FIG. 8B

|  | J2A | J2B | J2C | AVERAGE |
|---|---|---|---|---|
| ATOMIC CONCENTRATION OF SILICON (Si) | 0.65 | 0.7 | 0.65 | 0.67 |
| ATOMIC CONCENTRATION OF BARIUM (Ba) | 59.37 | 59.55 | 59.64 | 59.52 |
| Si/Ba (%) | 1.09 | 1.18 | 1.09 | 1.12 |

CERAMIC ELECTRONIC COMPONENT, MOUNTING SUBSTRATE ARRANGEMENT, AND METHODS OF MANUFACTURING CERAMIC ELECTRONIC COMPONENT

TECHNICAL FIELD

The present invention relates to ceramic electronic components, mounting substrate arrangements, and methods of manufacturing ceramic electronic components.

RELATED ART

In order to reduce the area of ceramic electronic components, there is a scheme of providing external electrodes substantially only on a single surface of a ceramic electronic component that is the mounting surface, which is to be mounted to a mounting substrate.

JP-A-2014-123694 and JP-A-2017-175105 disclose such schemes.

SUMMARY OF THE INVENTION

However, in a case in which external electrodes are provided substantially only on the mounting surface of a ceramic electronic component, the element body is likely to be damaged by stress applied through the external electrodes during mounting of the ceramic electronic component to the mounting substrate. In addition, in this case, the upper corners of the element body, which is opposite to the mounting surface, are exposed from the external electrodes, so that the corners are likely to be chipped.

Accordingly, it is an object of the present invention to provide a ceramic electronic component that can reduce the area needed for the external electrodes while improving reliability, a mounting substrate arrangement having the ceramic electronic component, and a method of manufacturing the ceramic electronic component.

According to one aspect of the present invention, there is provided a ceramic electronic component including an element body including at least one first internal electrode, at least one second internal electrode disposed in parallel to the first internal electrode, and a dielectric interposed between the first internal electrode and the second internal electrode and surrounding the first internal electrode and the second internal electrode, the element body having a bottom surface on which an end of the first internal electrode and an end the second internal electrode are exposed and a top surface opposite to the bottom surface, the dielectric having bottom dielectric regions disposed adjacent to the bottom surface, a top dielectric region disposed adjacent to the top surface, and a middle height dielectric region disposed between the bottom dielectric regions and the top dielectric region; a first external electrode electrically connected to the end of the first internal electrode; and a second external electrode electrically connected to the end of the second internal electrode. The bottom dielectric regions and the top dielectric region both include one or more of group 14 elements and one or more of group 2 elements, and a ratio of a concentration of the one or more of group 14 elements to a concentration of the one or more of group 2 elements is higher in the bottom dielectric regions than in the top dielectric region.

The middle height dielectric region may include said one or more of group 14 elements and said one or more of group 2 elements, and the ratio of the concentration of the one or more of group 14 elements to the concentration of the one or more of group 2 elements may be higher in the bottom dielectric regions than in the middle height dielectric region.

The middle height dielectric region includes said one or more of group 14 elements and said one or more of group 2 elements, and the ratio of the concentration of the one or more of group 14 elements to the concentration of the one or more of group 2 elements is lower in the top dielectric region than in the middle height dielectric region.

A toughness of the bottom dielectric regions may be higher than a toughness of the middle height dielectric region.

A hardness of the top dielectric region may be higher than a hardness of the middle height dielectric region.

The element body may further have other surfaces connecting the bottom surface and the top surface, and upper corners formed by the other surfaces and the top surface, and the top dielectric region may contain the upper corners.

The upper corners of the element body may be chamfered.

The element body may include multiple first internal electrodes and multiple second internal electrodes that are alternately laminated in such a manner that the dielectric is interposed therebetween. The first external electrode may extend along a direction in which the first and second internal electrodes are laminated. The second external electrode may extend along the direction in which the first and second internal electrodes are laminated. Each of the first electrodes has a protruding pattern a bottom end of which is exposed only on the bottom surface of the element body, as said end of the first internal electrode. Each of the second internal electrodes has a protruding pattern a bottom end of which is exposed only on the bottom surface of the element body, as said end of the second internal electrode.

Each of the first external electrode and the second external electrode may include a base layer and a plating layer formed on the base layer. The base layer may contain metal, a co-material dispersed in the metal, and the one or more group 14 element dispersed in the metal.

Each of the bottom dielectric regions may include a diffusion layer formed by diffusion of the one or more group 14 element in the base layer into the bottom dielectric region.

The dielectric may contain a ceramic material that includes at least one of barium titanate, strontium titanate, calcium titanate, magnesium titanate, barium strontium titanate, barium calcium titanate, calcium zirconate, barium zirconate, and calcium titanate zirconate.

The one or more group 2 elements may be one or more of Be, Mg, Ca, Sr, and Ba, and the one or more group 14 elements may be one or more of C, Si, Ge, Sn, and Pb.

The group 2 element may be Ba, and wherein the group 14 element may be Si.

The bottom dielectric regions may have a ratio of an atomic concentration of Si to an atomic concentration of Ba that is equal to or greater than 1.3% and is equal to or less than 3.9%.

The top dielectric region may have a ratio of an atomic concentration of Si to an atomic concentration of Ba that is equal to or greater than 0% and is equal to or less than 1.0%.

According to another aspect of the present invention, there is provided an arrangement including the ceramic electronic component; a mounting substrate; a first land electrode formed on the mounting substrate; a second land electrode formed on the mounting substrate; a first solder layer connecting the first land electrode with the first external electrode; and a second solder layer connecting the second land electrode with the second external electrode.

According to another aspect of the present invention, there is provided a method of manufacturing a ceramic electronic component. The method includes forming an element body that includes at least one first internal electrode, at least one second internal electrode disposed in parallel to the first internal electrode, and a dielectric interposed between the first internal electrode and the second internal electrode and surrounding the first internal electrode and the second internal electrode, the dielectric including one or more of group 14 elements and one or more of group 2 elements, the element body having a bottom surface on which an end of the first internal electrode and an end of the second internal electrode are exposed and a top surface opposite to the bottom surface; applying a base material for base layers of external electrodes onto areas of the bottom surface on which the end of the first internal electrode and the end of the second internal electrode are respectively exposed, the base material containing metal and one or more group 14 elements dispersed in the metal; sintering the base material to form the base layers and to diffuse the one or more group 14 elements contained in the base material into bottom dielectric regions of the dielectric disposed adjacent to said areas of the bottom surface; and forming plating layers on the base layers, respectively.

The dielectric may have the bottom dielectric regions disposed adjacent to the bottom surface, a top dielectric region disposed adjacent to the top surface, and a middle height dielectric region disposed between the bottom dielectric regions and the top dielectric region. The sintering may be performed such that after sintering, a ratio of a concentration of the one or more of group 14 elements to a concentration of the one or more of group 2 elements is lower in the top dielectric region than in the middle height dielectric region.

Forming the element body may include attaching a green sheet in which a ratio of the concentration of the one or more of group 14 elements to the concentration of the one or more of group 2 elements is lower than that in the middle height dielectric region to the top dielectric region.

The one or more of group 2 elements may be Ba, and the one or more of group 14 elements may be Si.

According to at least some of these aspects of the invention, it is possible to reduce the area needed for the external electrodes while improving reliability.

BRIEF DESCRIPTION OF THE DRAWINGS

FIG. 2A is a cross-sectional view of the multilayer ceramic capacitor taken along line A1-A1 (taken along a width direction) in FIG. 1;

FIG. 2B is a cross-sectional view of the multilayer ceramic capacitor taken along line B1-B1 (taken along a longitudinal direction) in FIG. 1;

FIG. 5 is a cross-sectional view showing an arrangement according to a second embodiment of the present invention in which the multilayer ceramic capacitor is mounted on a mounting substrate;

FIG. 7 is a table showing results of experiments for confirming suitable ratios of the concentration of a group 14 element to the concentration of a group 2 element in bottom dielectric regions and suitable ratios in a top dielectric region of multilayer ceramic capacitors;

FIG. 8A is a table showing atomic concentrations of Si and Ba at different positions in the bottom dielectric regions of a specimen; and FIG. 8B is a table showing atomic concentrations of Si and Ba at different positions in the top dielectric region of the specimen.

DESCRIPTION OF EMBODIMENTS

Figure 1:
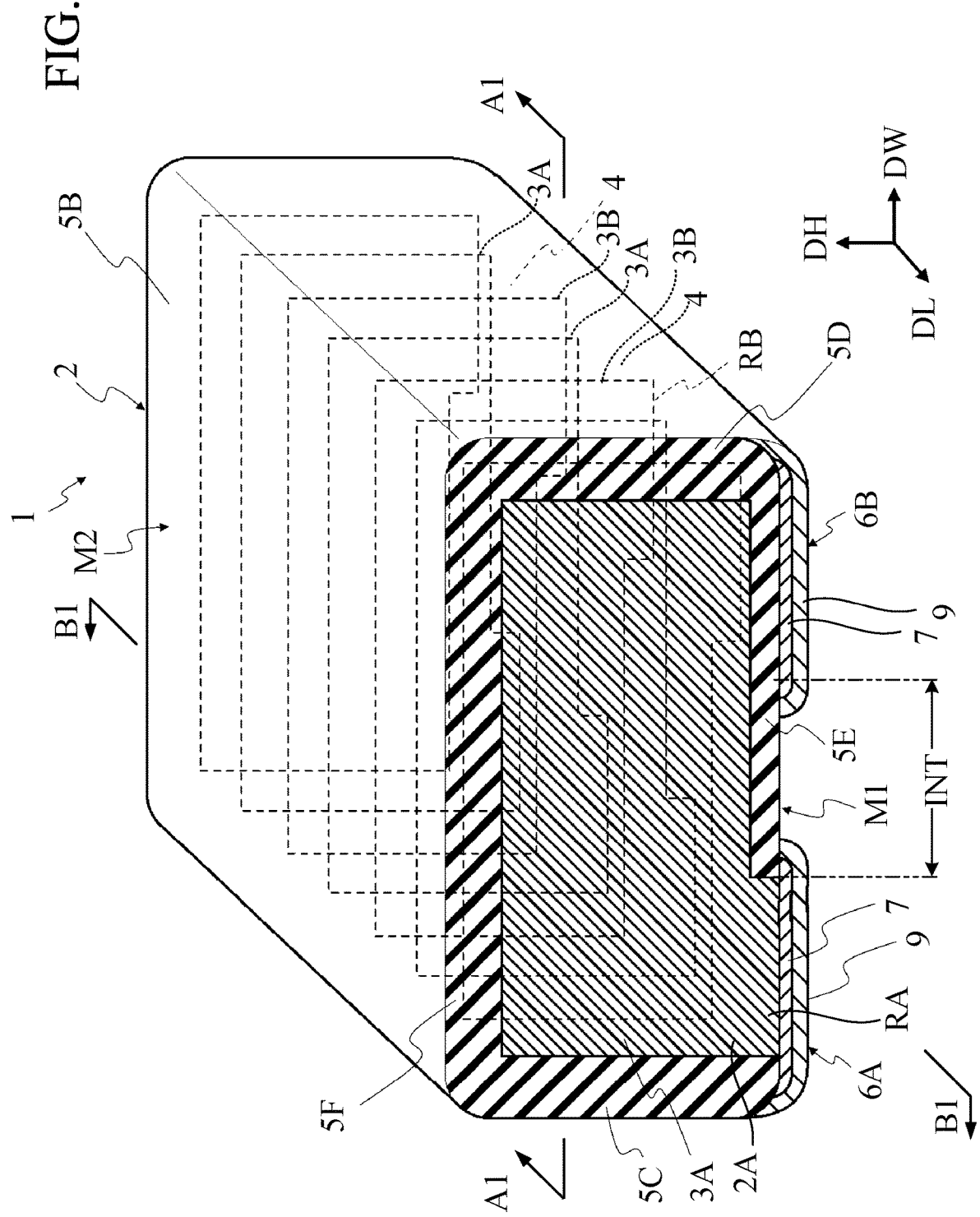
FIG. 1 is a perspective cutaway drawing of a multilayer ceramic capacitor according to a first embodiment of the present invention.

Embodiments of the present invention will now be described with reference to the accompanying drawings. The following embodiments are not intended to limit the present invention. The combination of all the features described in each of the embodiments is not absolutely necessary for the present invention. The configuration of each embodiment may be modified and/or changed depending upon designs, specifications, and various conditions of an apparatus and a device to which the present invention is applied (use conditions, use environment, and the like). The technical scope of the invention is defined by the appended claims and is not limited by the following embodiments. Furthermore, parts, components, and elements shown in the drawings used in connection with the following description may be different from actual parts, components, and elements in the structure, scale, and shape for the sake of easier understanding of the parts, components, and elements.

First Embodiment

FIG. 1 is a perspective cutaway view of a multilayer ceramic capacitor according to a first embodiment of the present invention. FIG. 2A is a cross-sectional view of the multilayer ceramic capacitor taken along the line A1-A1 (taken along a width direction) in FIG. 1. FIG. 2B is a cross-sectional view of the multilayer ceramic capacitor taken along the line B1-B1 (taken along a longitudinal direction) in FIG. 1. It is of note that, in FIG. 1, a part is cut away along the line C1-C1 in FIG. 2B.

As shown in FIGS. 1, 2A, and 2B, the multilayer ceramic capacitor 1 includes an element body (element assembly) 2 and external electrodes (outer electrodes) 6A and 6B. The element body 2 has a laminate (or stack) 2A, cover layers 5A and 5B, and margin layers 5C to 5F. The laminate 2A has internal electrode layers (inner electrode layers) 3A, other internal electrode layers 3B, and dielectric layers 4 interposed between neighboring internal electrode layers 3A and 3B.

The dielectric layers 4, the cover layers 5A and 5B, and the margin layers 5C to 5F can be formed of a dielectric containing group 2 and group 14 elements. A group 2 element is, for example, Be (beryllium), Mg (magnesium), Ca (calcium), Sr (strontium), or Ba (barium). A group 14 element is, for example, C (carbon), Si (silicon), Ge (germanium), Sn (tin), or Pb (lead). It is preferable that the element body 2 contains Ba as the group 2 element and Si as the group 14 element.

The internal electrode layers 3A and 3B are alternately stacked in such a manner that the dielectric layers 4 are interposed therebetween. Although FIG. 2B shows an example in which ten internal electrode layers 3A and 3B are stacked in total, the number of stacked internal electrode layers 3A and 3B is not limited.

The shape of the element body 2 may be a substantially rectangular parallelepiped shape, and the shape of the laminate 2A may also be a substantially rectangular parallelepiped shape. The element body 2 may be chamfered along the respective corners of the element body 2.

The element body 2 has a bottom surface M1 and a top surface M2, which are opposite to each other.

In the following description, the direction perpendicularly passing through the surfaces M1 and M2 may be referred to as a height direction (thickness direction) DH of the element body 2, the direction perpendicular to height direction DH and parallel to the internal electrode layers 3A and 3B may be referred to as a width direction DW of the element body 2, and the direction perpendicular to the longitudinal direction DL and the width direction DW may be referred to as a longitudinal direction DL of the element body 2.

The internal electrode layers 3A and 3B are stacked in the longitudinal direction DL in such a manner that the dielectric layers 4 are interposed therebetween.

The multilayer ceramic capacitor 1 is mounted on a mounting substrate and is used for various purposes including eliminating noise applied to semiconductor chips mounted on the mounting substrate.

A pair of opposite surfaces of the element body 2 that are substantially parallel to the mounting substrate are the bottom surface M1 and the top surface M2. In addition, a pair of opposite surfaces of the element body 2 that are spaced apart from each other in the width direction DW may be referred to as a pair of side surfaces, and a pair of opposite surfaces of the element body 2 that are spaced apart from each other in the longitudinal direction DL may be referred to as a pair of end surfaces.

In the specification, the terms, "top surface", "bottom surface", "side surfaces", "height", "thickness", "width", "right", "left", etc., are used for ease of understanding and are not intended to limit the orientation of the multilayer ceramic capacitor 1 when it is mounted on the mounting substrate.

As shown in FIG. 2B, the upper edges of the internal electrode layers 3A and 3B are covered with the margin layer 5F. The upper edges of the internal electrode layers 3A and 3B may be aligned with each other.

On the other hand, the lower ends of the internal electrode layers 3A and 3B are only partially covered with the margin layer 5E, and are partially exposed. As shown in FIG. 1, the lower left corners RA of the internal electrode layers 3A protrude downward and are exposed, whereas the lower right edges of the internal electrode layers 3A are covered with the margin layer 5E. In contrast, the lower right corners RB of the internal electrode layers 3B protrude downward and are exposed, whereas the lower left edges of the internal electrode layers 3B are covered with the margin layer 5E.

The left side edges of the internal electrode layers 3A and 3B may be aligned with each other, and the right side edges of the internal electrode layers 3A and 3B may be aligned with each other.

The external electrodes 6A and 6B are located on the bottom surface M1. The external electrodes 6A and 6B are distant from each other in the width direction DW, extend along the longitudinal direction DL, and are arranged in parallel with each other.

The lower left corners RA of the internal electrode layers 3A and the lower right corners RB of the internal electrode layers 3B are distant from each other in the width direction DW, extend along the width direction DW, and are arranged in parallel with each other in the longitudinal direction DL. The lower left corners RA of the internal electrode layers 3A and the lower right corners RB of the internal electrode layers 3B are exposed on the bottom surface M1.

The lower left corners RA of the internal electrode layers 3A, which are not covered with the margin layer 5E, will be referred to as exposed protrusions RA of the internal electrode layers 3A. The lower right corners RB of the internal electrode layers 3B, which are not covered with the margin layer 5E, will be referred to as exposed protrusions RB of the internal electrode layers 3B.

The exposed protrusions RA of the internal electrode layers 3A are brought into contact with and are electrically connected to the external electrode 6A. The exposed protrusions RB of the internal electrode layers 3B are brought into contact with and are electrically connected to the external electrode 6B.

The exposed protrusions RA of the internal electrode layers 3A are aligned in the longitudinal direction DL, and the exposed protrusions RB of the internal electrode layers 3B are also aligned in the longitudinal direction DL.

The interval INT between the exposed protrusions RA and RB in the width direction DW is 110 micrometers or more.

The cover layers 5A and 5B are located on the end surfaces of the element body 2, respectively, so as to cover the end surfaces of the laminate 2A, which is interposed therebetween in the stacking direction (longitudinal direction DL).

The side margin layers 5C and 5D are located on the side surfaces of the element body 2, respectively, so as to cover the side surfaces of the laminate 2A, which is interposed therebetween in the width direction DW. The margin layers 5C and 5D cover the side edges of the internal electrode layers 3A and 3B.

The margin layers 5E and 5F are located on the bottom and the top surfaces of the element body 2, respectively, so as to cover the bottom and the top surfaces of the laminate 2A, which is interposed therebetween in the height direction DH. The top margin layer 5F covers the upper edges of the internal electrode layers 3A and 3B. The bottom margin layer 5E partially covers the lower ends of the internal electrode layers 3A and 3B.

As depicted by phantom lines in FIG. 2A, the bottom margin layer 5E includes a left bottom dielectric region R1A, a right bottom dielectric region R1B, and an intermediate bottom dielectric region R1C. The left bottom dielectric region R1A is disposed adjacent to the external electrode 6A and the exposed protrusions RA of the internal electrode layers 3A. The right bottom dielectric region R1B is disposed adjacent to the external electrode 6B and the exposed protrusions RB of the internal electrode layers 3B. As depicted by phantom lines in FIG. 2A, the left and right bottom dielectric regions R1A and R1B extend along the longitudinal direction DL, but the exposed protrusions RA or RB are embedded in the corresponding bottom dielectric regions R1A or R1B.

The top margin layer 5F includes a top dielectric region R2. The top dielectric region R2 may contain the upper corners of the element body 2 and extends along the longitudinal direction DL and the width direction DW. The top dielectric region R2 may correspond to the entirety of the top margin layer 5F, and may be exposed to the exterior.

Furthermore, the element body 2 includes a middle height dielectric region R3 between the margin layers 5E and 5F. The middle height dielectric region R3 includes the dielectric layers 4 between the internal electrode layers 3A and 3B, the cover layers 5A and 5B, and the side margin layers 5C and 5D.

The ratio of the concentration of the group 14 element to the concentration of the group 2 element in the left and right bottom dielectric regions R1A and R1B is higher than that in the top dielectric region R2, and may be higher than that in the middle height dielectric region R3. The ratio of the concentration of the group 14 element to the concentration of the group 2 element in the top dielectric region R2 may be lower than that in the middle height dielectric region R3.

In a case in which the group 2 element is Ba and the group 14 element is Si, it is preferable that the ratio of the concentration of Si to the concentration of Ba in the left and right bottom dielectric regions R1A and R1B be equal to or greater than 1.3% and be equal to or less than 3.9%, and it is preferable that the ratio of the concentration of Si to the concentration of Ba in the top dielectric region R2 be equal to or greater than 0% and be equal to or less than 1.0%.

The ratio of the concentration of the group 14 element to the concentration of the group 2 element in the intermediate bottom dielectric region R1C between the left and right bottom dielectric regions R1A and R1B may be lower than that in the left and right bottom dielectric regions R1A and R1B.

The toughness of the left and right bottom dielectric regions R1A and R1B may be higher than that of the middle height dielectric region R3. The toughness of the regions R1A, R1B, and R3 can be evaluated, for example, by Young's moduli of the regions R1A, R1B, and R3. When the ratio of the concentration of the group 14 element to the concentration of the group 2 element in the left and right bottom dielectric regions R1A and R1B is higher than that in the middle height dielectric region R3, the toughness of the left and right bottom dielectric regions R1A and R1B can be made higher than that of the middle height dielectric region R3.

The hardness of the top dielectric region R2 may be higher than that of the middle height dielectric region R3. The hardness of the regions R2 and R3 can be evaluated, for example, by Vickers hardness of the regions R2 and R3. When the ratio of the concentration of the group 14 element to the concentration of the group 2 element in the top dielectric region R2 is lower than that in the middle height dielectric region R3, the hardness of the top dielectric region R2 can be higher than that of the middle height dielectric region R3.

By placing the external electrodes 6A and 6B on the bottom surface M1 of the element body 2, the external electrodes 6A and 6B can be prevented from protruding upward than the element body 2, or from spreading out of the area of the element body 2 in the width direction DW and longitudinal direction DL. This allows the area of the multilayer ceramic capacitor 1 to be reduced, while reducing the height of the multilayer ceramic capacitor 1. Accordingly, the multilayer ceramic capacitor 1 is suitable for an LSC (land-side capacitor) technique, in which multilayer ceramic capacitors are mounted on surfaces of substrates opposite to the mounting surfaces for IC chips, so that the mounting density of electronic components mounted on substrates can be increased.

In this embodiment, the ratio of the concentration of the group 14 element to the concentration of the group 2 element in the left and right bottom dielectric regions R1A and R1B is higher than that in the middle height dielectric region R3. Thus, the concentration of the group 14 element in the middle height dielectric region R3 can be restricted, and the toughness of the left and right bottom dielectric regions R1A and R1B can be made higher than that of the middle height dielectric region R3. Accordingly, if the left and right bottom dielectric regions R1A and R1B are subject to stress exerted from the external electrodes 6A and 6B when the multilayer ceramic capacitor 1 is mounted on a substrate, the element body 2 is unlikely to be damaged. In addition, a reduction in the relative dielectric permittivity of the dielectric in the middle height dielectric region R3 can be prevented, thereby minimizing a decrease in the capacitance of the multilayer ceramic capacitor 1.

In this embodiment, the ratio of the concentration of the group 14 element to the concentration of the group 2 element in the top dielectric region R2 is lower than that in the middle height dielectric region R3, so that the hardness of the top dielectric region R2 can be higher than that of the middle height dielectric region R3. Therefore, the upper corners of the element body 2 are less likely to be chipped even when the multilayer ceramic capacitor 1 is struck by something during holding and transportation thereof.

The thicknesses of the internal electrode layers 3A and 3B and dielectric layers 4 are preferably in a range of 0.05 micrometers to 5 micrometers, e.g., 0.3 micrometers.

The main component of the material for the internal electrode layers 3A and 3B may be a metal, for example, Cu (copper), Fe (iron), Zn (zinc), Sn, Al (aluminum), Ni (nickel), Ti (titanium), Ag (silver), Au (gold), Pt (platinum), Pd (palladium), Ta (tantalum), or W (tungsten), or may be an alloy containing at least one of these metals.

The main component of the material for the dielectric layers 4 may be, for example, a ceramic material having a perovskite structure. The main component may be contained in a ratio of 50 at % or more. The ceramic material of the dielectric layers 4 may be, for example, barium titanate, strontium titanate, calcium titanate, magnesium titanate, barium strontium titanate, barium calcium titanate, calcium zirconate, barium zirconate, or calcium titanate zirconate.

The main component of the material for the cover layers 5A and 5B and the margin layers 5C to 5F may be, for example, a ceramic material. The main component of the ceramic material for the cover layers 5A and 5B and the margin layers 5C to 5F may be the same as the main component of the ceramic material of the dielectric layers 4.

The thickness of the margin layer 5E can be 15 micrometers, for example.

Each of the external electrodes 6A and 6B has a base layer 7 formed on the bottom surface M1 of the element body 2 and a plating layer 9 formed on the base layer 7.

The base layers 7 of the external electrodes 6A and 6B are spaced apart (separated) from each other in the width direction DW. The base layer 7 of each of the external electrodes 6A and 6B extends along the longitudinal direction DL and are in parallel with each other.

The electrically conductive material for the base layer 7 may be a metal, for example, Cu, Fe, Zn, Al, Ni, Pt, Pd, Ag, Au, and Sn, or may be an alloy containing at least one of these metals.

The base layer 7 may further include co-material particles dispersed in the metal. Here, the term "particle" is meant to include not only an individual small particle, but also a block formed by a combination of multiple small particles after the sintering process, which will be described later. The co-material dispersed like islands in the base layer 7 reduces the difference in thermal expansion coefficients of the element body 2 and the base layer 7 so as to alleviate thermal stress exerted in the base layer 7. The co-material is, for example, a ceramic component that is the main component of the material for the dielectric layers 4. The base layer 7 may also include a glass component. The glass component in the base layer 7 can densify the base layer 7. The glass component may be, for example, an oxide of Ba, Sr, Ca, Zn, Al, Si, B (boron), or the like.

The base layer 7 may also contain metal components contained in the element body 2. The metal component may be, for example, Mg, but may include Ni, Cr, Sr, Al, Na, and/or Fe in trace amounts. In this case, the base layer 7 may contain a compound of the metal used for the electrically conductive material for the base layer 7, the metal contained in the element body 2, and oxygen, for example, a compound including Mg, Ni, and O.

The base layer 7 is preferably formed of a sintered body of an electroconductive coating paste containing the dielectric material. This makes it possible to make the base layer 7 thicker while ensuring adhesion between the element body 2 and the base layer 7, so that the strength of the external electrodes 6A and 6B is ensured and the electric conductivity of the base layers 7 and the internal electrode layers 3A and 3B is ensured.

The base layer 7 also contains a group 14 element such as Si dispersed in the metal. Accordingly, each of the left and right bottom dielectric regions R1A and R1B can include a diffusion layer DF formed by diffusion in which the group 14 element added to the base layer 7 is diffused from the base layer 7 into the regions R1A and R1B. Thus, the ratio of the concentration of the group 14 element to the concentration of the group 2 element in the left and right bottom dielectric regions R1A and R1B can be made higher than that in the middle height dielectric region R3 by the sintering process, so that the toughness of the left and right bottom dielectric regions R1A and R1B can be increased without increasing the number of processes. The diffusion layer DF may be the same region as that of each of the left and right bottom dielectric regions R1A and R1B.

The plating layer 9 of each of the external electrodes 6A and 6B continuously covers the corresponding base layer 7. The plating layer 9 is electrically connected with the internal electrode layers 3A or 3B through the corresponding base layer 7. In addition, the plating layer 9 of each of the external electrodes 6A and 6B is electrically connected with an electrode on a mounting substrate via solder.

The material for the plating layer 9 may be a metal, for example, Cu, Fe, Zn, Al, Ni, Pt, Pd, Ag, Au, Sn, or the like, or may be an alloy containing at least one of these metals. The plating layer 9 may be a single layer of a single metal component or multiple layers of different metal components.

The plating layer 9 of each of the external electrodes 6A and 6B may have a three-layered structure consisting of, for example, a Cu plating layer formed on the base layer 7, a Ni plating layer formed on the Cu plating layer, and a Sn plating layer formed on the Ni plating layer. The Cu plating layer can improve the adhesiveness of the plating layer 9 to the base layer 7, and the Ni plating layer can improve the heat resistance of the external electrode 6A and 6B during soldering. The Sn plating layer can improve the wettability of the solder for the plating layer 9.

Figure 3:
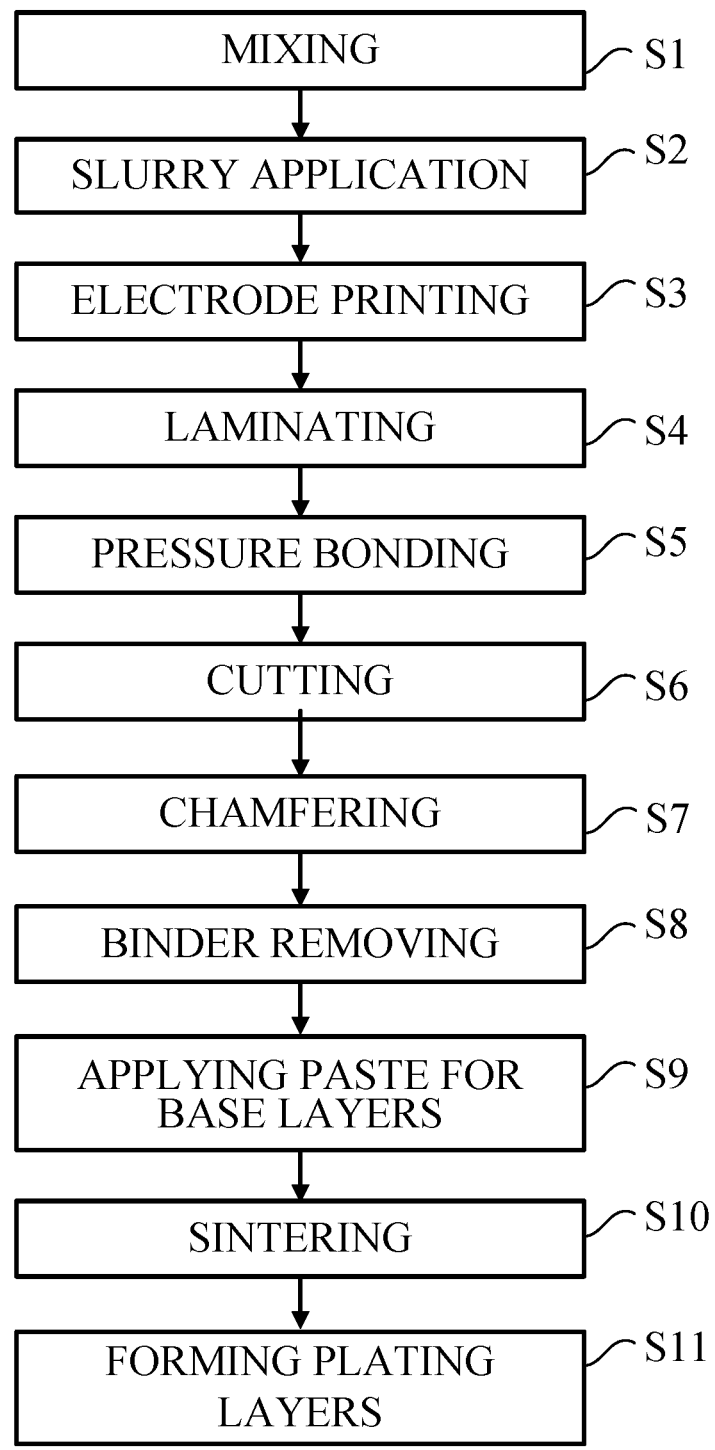
FIG. 3 is a flowchart showing an example of a method of manufacturing a multilayer ceramic capacitor according to the first embodiment.

FIG. 3 is a flowchart showing an example of a method of manufacturing a multilayer ceramic capacitor according to the first embodiment. FIGS. 4A to 4J are cross-sectional views showing an exemplary method of manufacturing the multilayer ceramic capacitor according to the first embodiment. FIGS. 4A to 4E show a cross section taken along line B1-B1 in FIG. 1, whereas FIGS. 4F to 4J show a cross section taken along line A1-A1 in FIG. 1. For the sake of illustration, FIG. 4C to FIG. 4E show only three internal electrode layers 3A and three internal electrode layers 3B laminated alternately in such a manner that the dielectric layers 4 are interposed therebetween.

In Step S1 of FIG. 3 (mixing step), an organic binder and an organic solvent, as a dispersant and a forming aid, are added to a dielectric material powder, and pulverized and mixed to produce a slurry. The dielectric material powder includes, for example, a ceramic powder. The dielectric material powder may include an additive or additives. The additive(s) may be, for example, an oxide of Mg (magnesium), Mn (manganese), V (vanadium), Cr (chromium), Y (yttrium), Sm (samarium), Eu (europium), Gd (cadmium), Tb (terbium), Dy (dysprosium), Ho (holmium), Er (erbium), Tm (thulium), Yb (ytterbium), Co (cobalt), Ni, Li (lithium), B, Na (sodium), K (potassium), or Si, or glass. The organic binder is, for example, a polyvinyl butyral resin or a polyvinyl acetal resin. The organic solvent is, for example, ethanol or toluene.

Figure 4A:
FIGS. 4A to 4J are cross-sectional views for describing the method of manufacturing the multilayer ceramic capacitor according to the first embodiment.

Next, in Step S2 of FIG. 3 (slurry application step), as shown in FIG. 4A, a green sheet 24 is manufactured. Specifically, the slurry containing the ceramic powder is applied onto a carrier film in a sheet form and dried to manufacture the green sheet 24. The carrier film is, for example, a PET (polyethylene terephthalate) film. The application of the slurry can be conducted with the use of, for example, a doctor blade method, a die coater method, or a gravure coater method. Step S2 is repeated to prepare a plurality of green sheets 24.

Figure 4B:
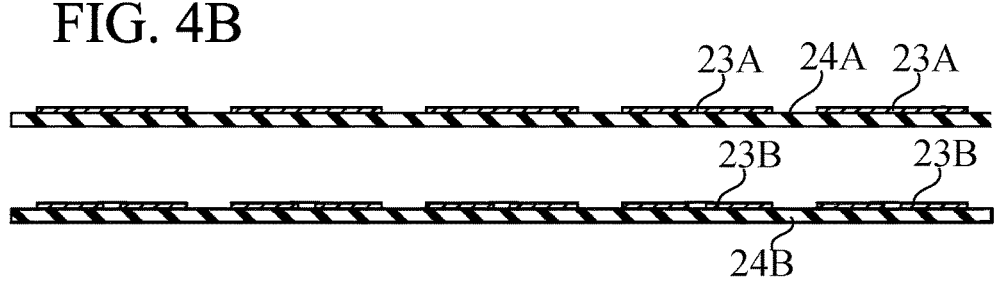
Figure 4C:
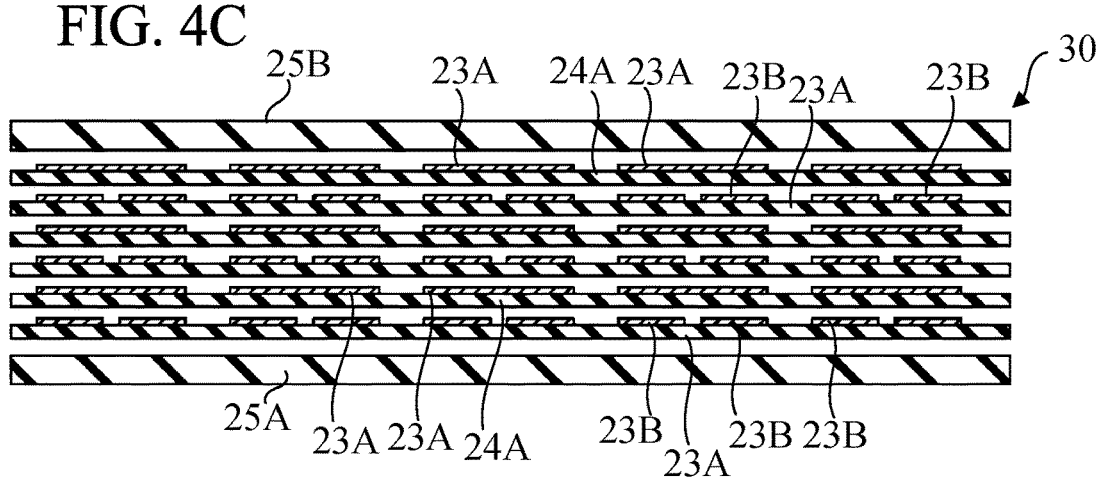
Figure 4D:
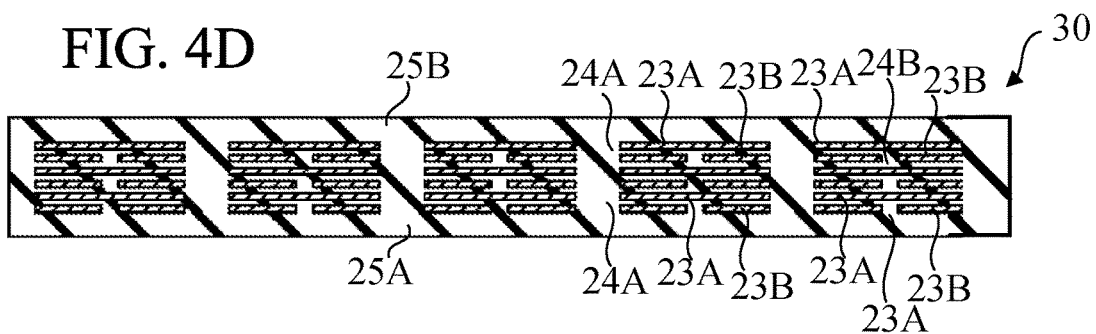
Figure 4E:
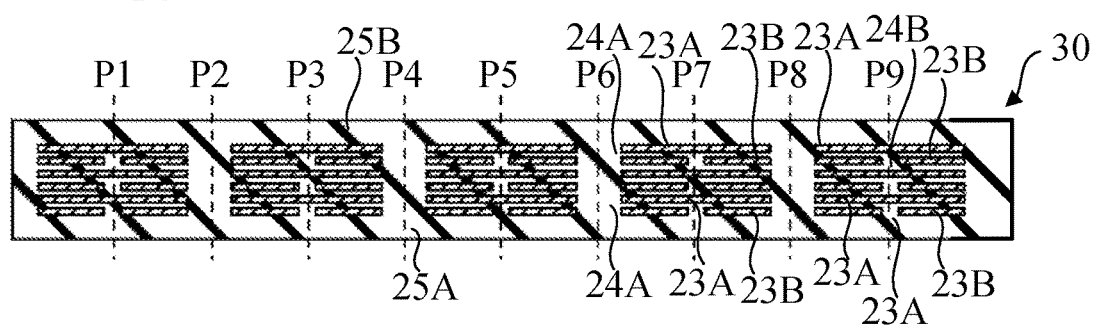

Next, in Step S3 of FIG. 3 (electrode printing step), as shown in FIG. 4B, an electroconductive paste, which will become an internal electrode layer, is applied in a predetermined pattern onto each of the green sheets 24 (24A and 24B), on which internal electrode layers 3A or 3B shown in FIG. 2B are to be placed, among the green sheets prepared in Step S1 to form internal electrode patterns 23A and 23B on the green sheets 24A and 24B.

Each single internal electrode pattern 23A correspond to two internal electrode layers 3A of which the exposed protrusions RA are connected. Each single internal electrode pattern 23B correspond to two internal electrode layers 3B of which the exposed protrusions RB are connected.

The electroconductive paste for the internal electrode layers includes a powder of the metal used as the material of the internal electrode layers 3A and 3B. For example, if the metal used as the material of the internal electrode layers 3A and 3B is Ni, the conductive paste for the internal electrode layers includes a powder of Ni. The conductive paste for the internal electrode layers also includes a binder, a solvent, and, if necessary, an auxiliary agent. The conductive paste for the internal electrode layers may include, as a co-material, a ceramic material having a main component that has the same composition as that of the main component of the material of the dielectric layers 4.

The application of the conductive paste for the internal electrode layers may be conducted with the use of a screen-printing method, an inkjet printing method, or a gravure printing method. Thus, Step S3 may be referred to as an electrode printing step. In this manner, a plurality of green sheets 24 that have the internal electrode patterns 23 thereon are prepared.

Next, in Step S4 of FIG. 3 (laminating step), as shown in FIG. 4C, the green sheets 24A and 24B on which the internal electrode patterns 23A and 23B are formed and green sheets 25A and 25B on which the internal electrode patterns are not formed are laminated in a predetermined order to create a block 30 of the green sheets.

The green sheets 25A and 25B on which the internal electrode patterns are not formed are used as the outer layers (the cover layers 5A and 5B). The green sheets 25A and 25B for the cover layers 5A and 5B are thicker than the green sheets 24A and 24B, on which the internal electrode patterns 23A and 23B are formed.

In Step S4, edges of the internal electrode patterns 23A and 23B are aligned in the width direction DW, so that the exposed protrusions RA and RB are aligned in the width direction DW.

Next, in Step S5 of FIG. 3 (pressure bonding step), as shown in FIG. 4D, the laminate block 30 obtained in the laminating step of Step S4 of FIG. 3 is pressed such that the green sheets 24A, 24B, 25A, and 25B are pressure-bonded. Pressing the laminate block 30 may be conducted by, for example, hydrostatically pressing the laminate block 30, which may be surrounded by a resin film.

In Step S6 of FIG. 3 (cutting step), as shown in FIG. 4E, the pressed laminate block 30 is cut such that the block 30 is separated into a plurality of element bodies, each of which has a rectangular parallelepiped shape.

Cutting of the laminate block 30 is conducted at planes P1 to P9 regularly spaced from each other in the height direction DH of FIG. 2B. The planes P1, P3, P5, P7, and P9 correspond to the bottom surface M1 of each element body 2 shown in FIGS. 1 and 2B, so that two exposed protrusions RA of two internal electrode layers 3A, which are connected with each other, are separated at the planes P1, P3, P5, P7, and P9 and two exposed protrusions RB of two internal electrode layers 3B, which are connected with each other, are separated at the planes P1, P3, P5, P7, and P9. The planes P2, P4, P6, and P8 correspond to the top surface M2 of each element body 2 shown in FIGS. 1 and 2B, and cutting at the planes P2, P4, P6, and P8 do not involve the internal electrode patterns 23A and 23B.

Cutting of the laminate block 30 may be conducted by, for example, blade dicing or a similar method.

Figure 4F:
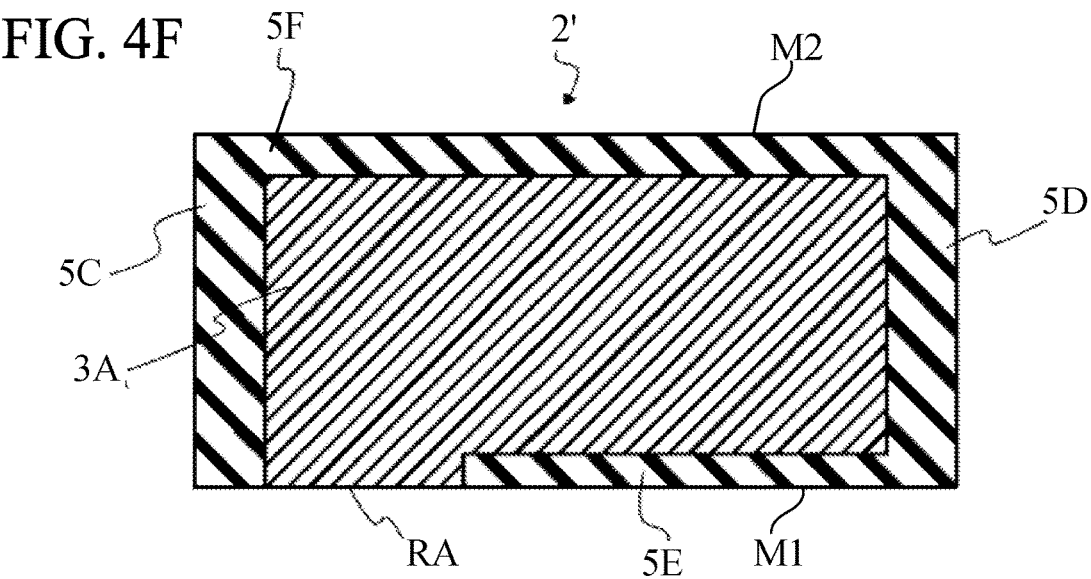

The resulting element body 2' is shown in an enlarged manner in FIG. 4F, in which the orientation is changed from FIG. 4E. In each of the individual element bodies 2', the internal electrode layers 3A and 3B are alternately laminated in such a manner that the dielectric layers 4 are interposed therebetween, and the cover layers 5A and 5B and the margin layers 5C to 5F are also formed.

It is of note that as shown in FIG. 2B, the stacking direction of the internal electrode layers 3A and 3B is the longitudinal direction DL of the element body.

As shown in FIG. 4F, the exposed protrusions RA of the internal electrode layers 3A are exposed on the bottom surface M1. Although not shown in FIG. 4F, the internal electrode layers 3B are line-symmetric to the internal electrode layers 3A with respect to the vertical center in FIG. 4F, and thus, the exposed protrusions RB of the internal electrode layers 3B are also exposed on the bottom surface M1.

Figure 4G:
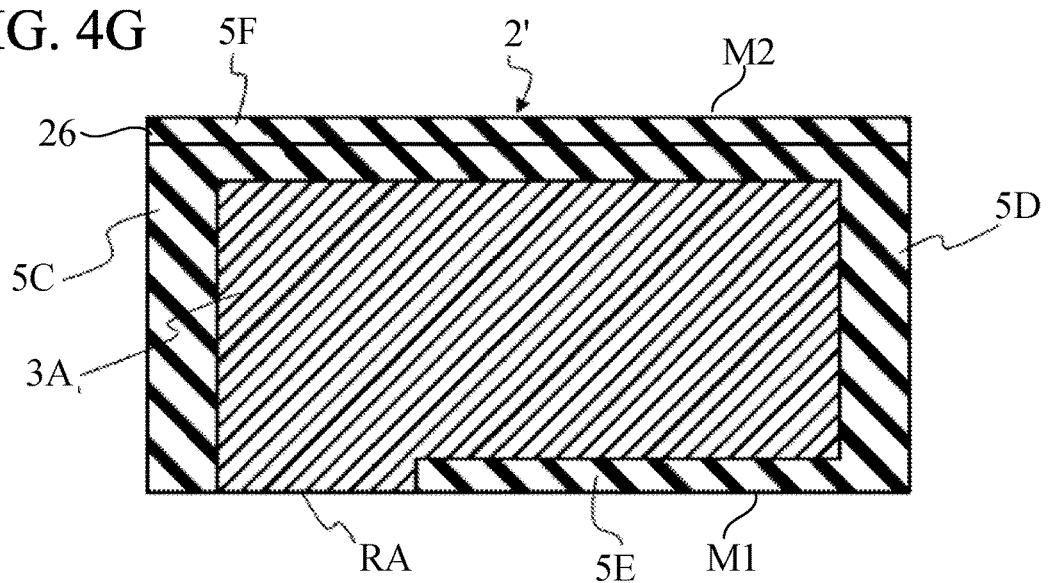

In order to lower the ratio of the concentration of the group 14 element (e.g., Si) to the concentration of the group 2 element (e.g., Ba) in the top dielectric region R2 than that in the middle height dielectric region R3, a green sheet 26 in which the ratio of the concentration of the group 14 element (e.g., Si) to the concentration of the group 2 element (e.g., Ba) is lower than that in the green sheets 24A and 24B may be attached to the top dielectric region R2, as shown in FIG. 4G.

Figure 4H:
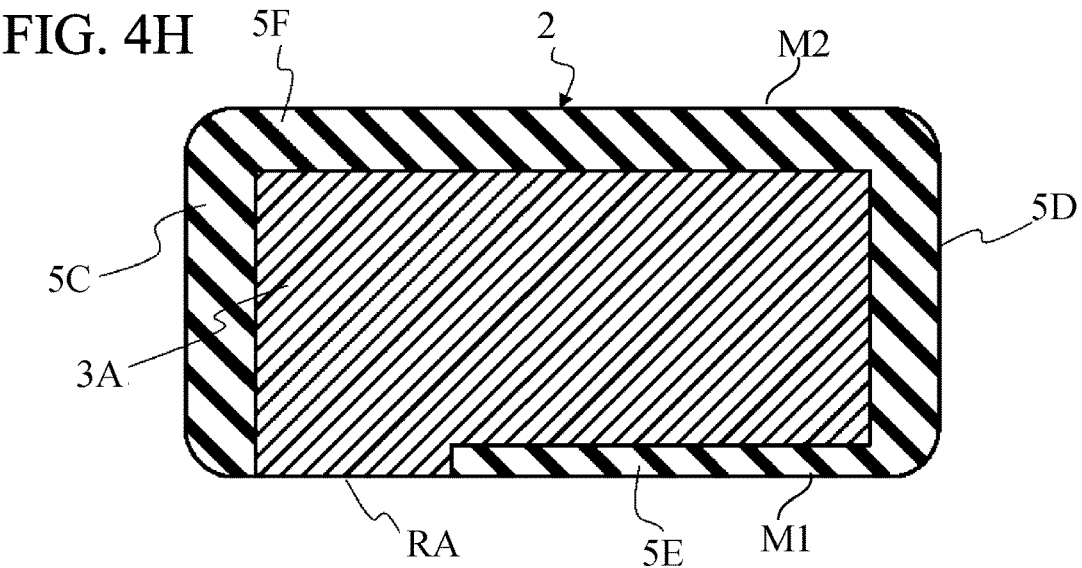

Next, in Step S7 of FIG. 3 (chamfering step), as shown in FIG. 4H, corners of each element body 2' are chamfered, so that the element body 2 having curved surfaces at corners are formed. For example, barrel polishing can be used for chamfering the element bodies 2'.

Next, in Step S8 of FIG. 3 (binder removing step), the binder contained in each of the element bodies 2 is removed. The removal of the binder is conducted by, for example, heating the element bodies 2 in an $N_2$ atmosphere at about 350 degrees Celsius.

Next, in Step S9 of FIG. 3 (step of applying a paste for the base layers), an electroconductive paste for the base layers (underlayers) 7 is selectively applied to the bottom surface M1 of each element body 2 from which the binder has been removed in Step S8. The paste is applied only on areas corresponding to the base layer 7 of each of the external electrodes 6A and 6B. The paste for the left external electrode 6A is brought into contact with the exposed protrusions RA of the internal electrode layers 3A, whereas the paste for the right external electrode 6B is brought into contact with the exposed protrusions RB of the internal electrode layers 3B.

For example, a screen-printing method, an inkjet printing method, or a gravure printing method can be used to selectively apply the conductive paste for the base layers to these areas on the bottom surface M1 of each element body 2.

Then, the conductive paste is dried.

The conductive paste for the base layers 7 contains a powder or filler of the metal used as the conductive material of the base layers 7. For example, when the metal used as the conductive material of the base layers 7 is Ni, the conductive paste for the base layers includes a powder or filler of Ni. The conductive paste for the base layers 7 also contains, as a co-material, a ceramic component, which is the main component of the material of the dielectric layers 4, for example. Particles of oxide ceramics mainly composed of barium titanate (e.g., 0.8 micrometers to 4 micrometers in D50 particle diameter), for example, are mixed in the conductive paste for the base layers, as the co-material. The conductive paste for the base layers further contains a binder and a solvent.

In addition, the conductive paste for the base layers contains a group 14 element, such as Si. For this purpose, a glass component such as $SiO_2$ may be added to the conductive paste.

Figure 4I:
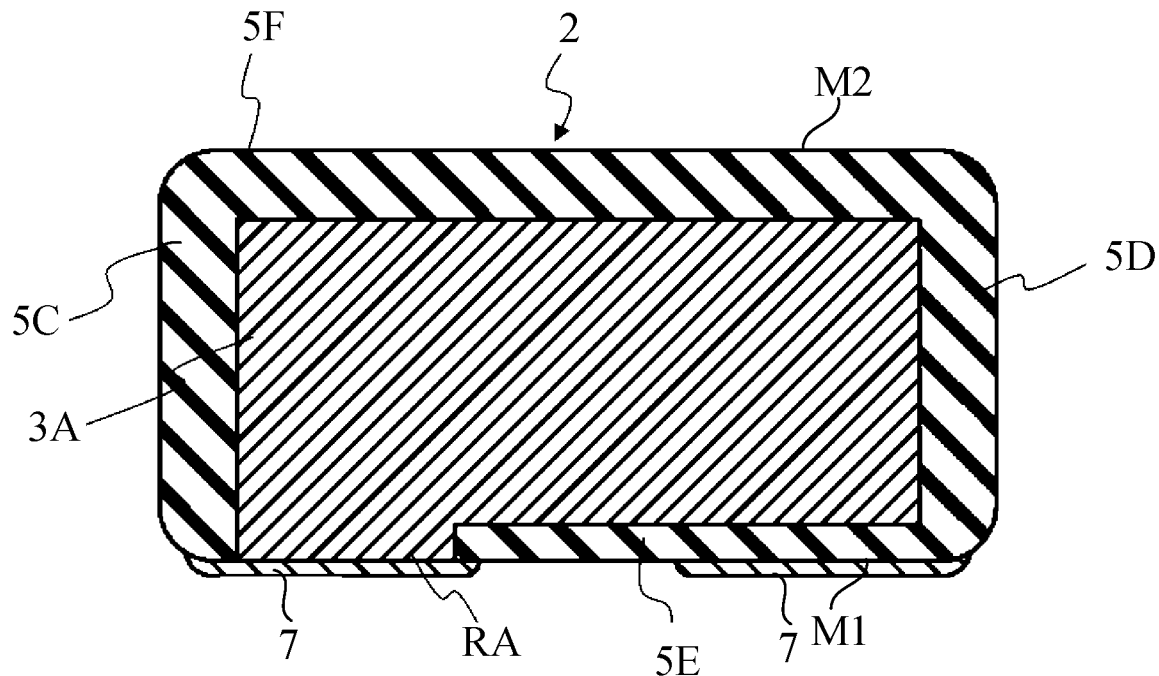

Next, in Step S10 of FIG. 3 (sintering step), as shown in FIG. 4I, the element bodies 2, on which the conductive paste for the base layers 7 has been applied in Step S8, undergo the sintering process such that the internal electrode layers 3A and 3B are integrated with the dielectric layers 4 in each element body 2 and the base layers 7 are integrated with the element body 2. Accordingly, the base layer 7 of the left external electrode 6A is fixed to the exposed protrusions RA of the internal electrode layers 3A, and the base layer 7 of the right external electrode 6B is fixed to the exposed protrusions RB of the internal electrode layers 3B. The sintering of the element bodies 2 and the conductive paste is conducted in, for example, a sintering furnace in a temperature range from 1000 degrees Celsius to 1400 degrees Celsius for ten minutes to two hours.

If a base metal such as Ni or Cu is used as the material for the internal electrode layers 3A and 3B, the sintering process may be conducted in the sintering furnace while the interior of the sintering furnace is kept to a reducing atmosphere in order to prevent oxidation of the internal electrode layers 3A and 3B.

By the heat treatment of the element body 2 on which the conductive paste for the base layers has been applied, the group 14 element (e.g., Si) contained in the conductive paste can be diffused into the bottom margin layer 5E, so that the ratio of the concentration of the group 14 element (e.g., Si) in the left and right bottom dielectric regions R1A and R1B can be increased, whereas the ratio of the concentration of the group 14 element (e.g., Si) in the intermediate bottom dielectric region R1C is not increased.

In the sintering step, some oxide components in the dielectric material in the element body 2 may be reduced, so that a re-oxidation step may be conducted after the sintering step. The re-oxidation step may be conducted in an $N_2$ atmosphere in a temperature range from 600 degrees Celsius to 1000 degrees Celsius.

Figure 4J:
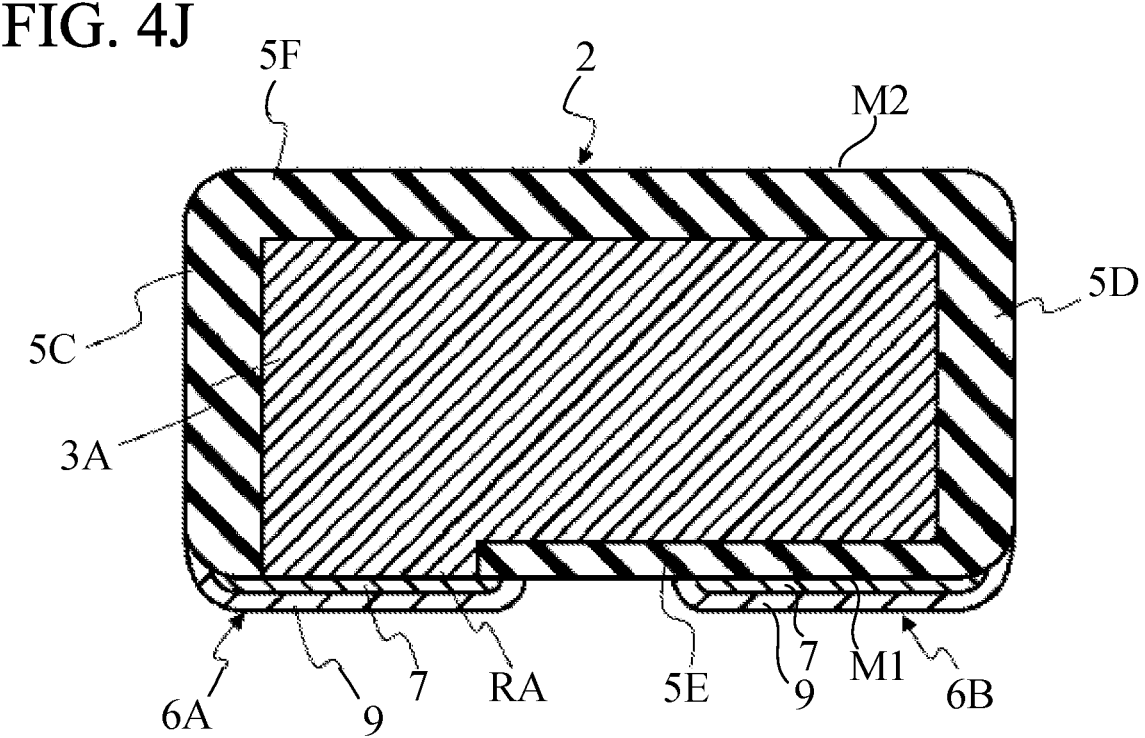

Next, in Step S11 of FIG. 3 (step of forming the plating layers), as shown in FIG. 4J, the plating layers 9 are formed on the base layers 7. In forming the plating layer 9, for example, a Cu plating layer, a Ni plating layer, and a Sn plating layer may be formed sequentially. The plating layers can be formed by placing the element body 2, on which the base layers 7 have been formed, inside a barrel to immerse it in a plating solution in the barrel, and by rotating the barrel to perform electroplating.

At this time, multiple element bodies 2 with the base layers 7 are agitated in the barrel, and frequently collide with each other.

However, by the sintering step S10, the ratio of the concentration of the group 14 element to the concentration of the group 2 element in the top dielectric region R2 was made lower than that in the middle height dielectric region R3, so that the hardness of the top dielectric region R2 was made higher than that of the middle height dielectric region R3. Therefore, the upper corners at the top surface M2 of the element body 2 are less likely to be chipped even when the element bodies 2 collide with each other frequently in the barrel.

The conductive paste for the base layers may be attached to lower parts of the side margin layers 5C and 5D. In this case, the base layer 7 and the plating layer 9 of each of the external electrodes 6A and 6B may be attached to the lower part of the corresponding side margin layer 5C or 5D.

When the group 14 element (e.g., Si) diffuses from the conductive paste into the left and right bottom dielectric regions R1A and R1B in the bottom margin layer 5E, the lower parts of the side margin layers 5C and 5D (near the left and right bottom dielectric regions R1A and R1B), to which the external electrodes 6A and 6B are attached, can contain a high amount of the group 14 element in a similar manner as the left and right bottom dielectric regions R1A and R1B. In this case, the conductive paste for the base layers may be applied to the bottom surface M1 and the side surfaces of the element body 2 by dipping.

Second Embodiment

FIG. 5 is a cross-sectional view showing an arrangement according to a second embodiment of the present invention, in which the multilayer ceramic capacitor 1 is mounted on a mounting substrate 41.

As shown in FIG. 5, land electrodes 42A, 42B, 44A, and 44B are formed on the reverse surface of the mounting substrate 41. The multilayer ceramic capacitor 1 is connected to the land electrodes 42A and 42B via solder layers 43A and 43B attached to the plating layers 9 of the external electrodes 6A and 6B, respectively.

Solder balls 47A and 47B are formed on the land electrodes 44A and 44B, respectively on the reverse surface of the mounting substrate 41.

On the other hand, a semiconductor chip, which is not shown, is mounted on the opposite surface of the mounting substrate 41. The semiconductor chip may be a microprocessor, a semiconductor memory, or an FPGA (Field-Programmable Gate Array), or an ASIC (Application Specific Integrated Circuit).

Land electrodes 46A and 46B are formed on the reverse surface of another mounting substrate 45. The mounting substrates 41 and 45 are connected to each other via solder balls 47A and 47B. The mounting substrate 45 can be used as a mother board on which the mounting substrate 41 is mounted.

The interval between the mounting substrates 41 and 45 is maintained constant by the solder balls 47A and 47B. In addition, a sealing resin 48 that encapsulates the multilayer ceramic capacitor 1 is filled in the space between the mounting substrates 41 and 45. The sealing resin 48 is, for example, an epoxy resin. After the mounting substrates 41 and 45 are connected to each other via the solder balls 47A and 47B, the resin 48 may be filled in the space between the mounting substrates 41 and 45 and cured. In this case, the sealing resin 48 covers the multilayer ceramic capacitor 1, the solder layers 43A and 43B, and the solder balls 47A and 47B, and adheres to the top surface M2 of the element body 2.

By mounting the multilayer ceramic capacitor 1 on the reverse surface of the mounting substrate 41, which is opposite to the other surface on which the semiconductor chip is mounted, the multilayer ceramic capacitor 1 can be arranged in close proximity to the semiconductor chip, thereby effectively eliminating noise affecting the semiconductor chip.

By placing the external electrodes 6A and 6B on the bottom surface M1 of the element body 2, the external electrodes 6A and 6B can be prevented from protruding upward than the element body 2 and it is possible to prevent the solder layers 43A and 43B from wetting up to protrude beyond the top surface M2 of the multilayer ceramic capacitor 1 through the external electrodes 6A and 6B, thereby reducing the height of the multilayer ceramic capacitor 1. This makes it possible to arrange the multilayer ceramic capacitor 1 in the space between the mounting substrates 41 and 45, which are connected to each other via the solder balls 47A and 47B, so that the multilayer ceramic capacitor 1 can be used as an LSC.

By increasing the toughness of the left and right bottom dielectric regions R1A and R1B in the element body 2 that are adjacent to the external electrodes 6A and 6B, even if the left and right bottom dielectric regions R1A and R1B are subject to stress exerted from the external electrodes 6A and 6B when the multilayer ceramic capacitor 1 is mounted on the mounting substrate 41, the element body 2 is unlikely to be damaged.

The hardness of the top dielectric region R2 in the element body 2 is higher than that of the middle height dielectric region R3. Therefore, the upper corners of the element body 2 are less likely to be chipped even when a shock is applied to the upper corners of the element body 2, e.g., during the installation of the multilayer ceramic capacitor 1 between the mounting substrates 41 and 45.

Third Embodiment

Figure 6:
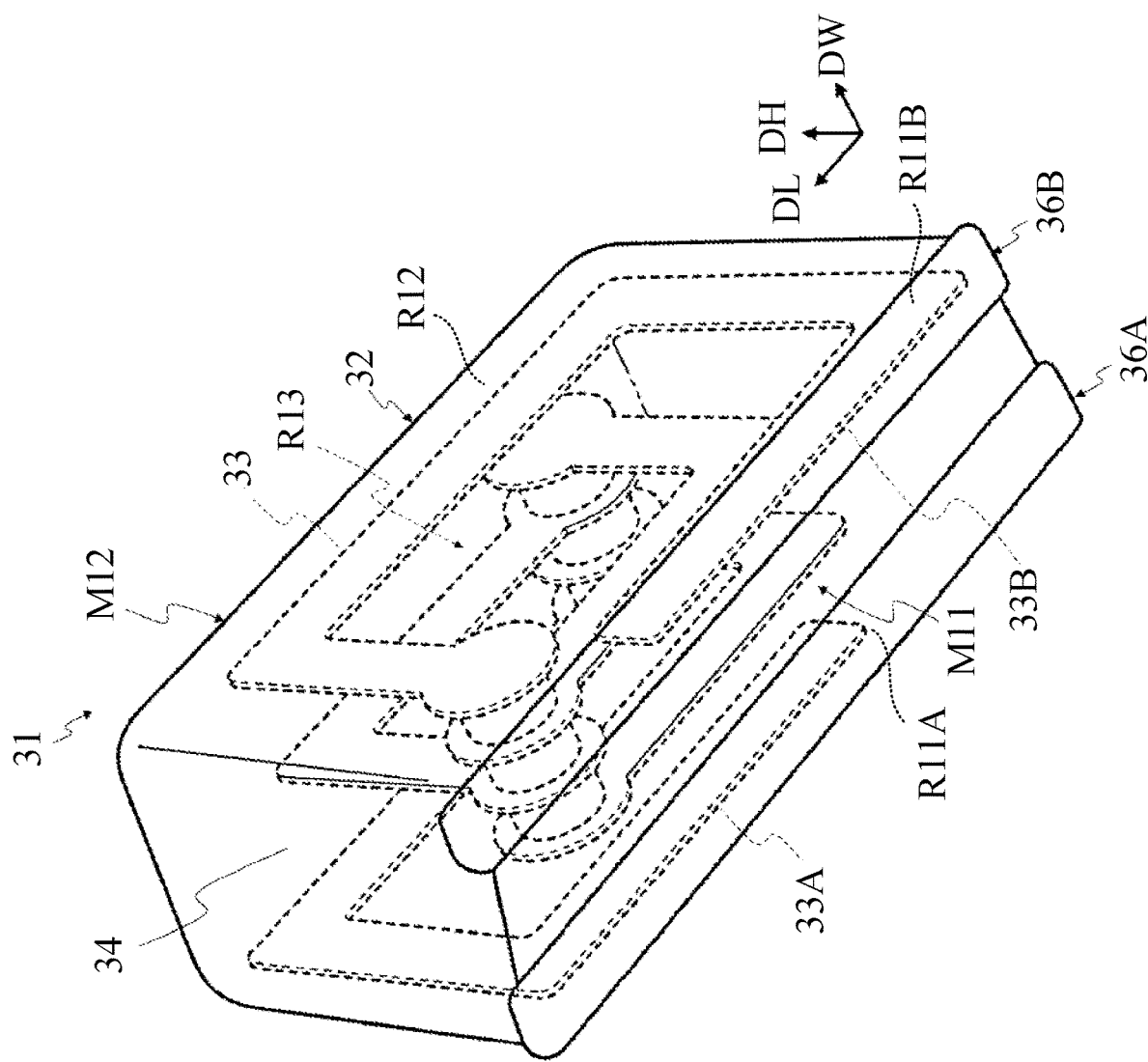
FIG. 6 is a perspective view showing a ceramic electronic component according to a third embodiment of the present invention.

FIG. 6 is a perspective view showing a ceramic electronic component according to a third embodiment of the present invention. In FIG. 6, a chip inductor is taken as an example as a ceramic electronic component.

The chip inductor 31 includes an element body 32 and two external electrodes 36A and 36B. The element body 32 includes a coil pattern 33 that includes two terminal segments 33A and 33B formed at both ends thereof and a magnetic material 34. The magnetic material 34 is used as a dielectric to insulate the internal electrode layers formed by the coil pattern 33.

The element body 32 may be of a substantially rectangular parallelepiped shape and has a bottom surface M11 and a top surface M12. The element body 32 may be chamfered along the respective corners thereof.

The coil pattern 33 is embedded in the magnetic material 34. However, the terminal segment 33A is exposed from the magnetic material 34 on the bottom surface M11 of the element body 32 and is connected to the external electrode 36A, and the terminal segment 33B is exposed from the magnetic material 34 on the bottom surface M11 of the element body 32 and is connected to the external electrode 36B.

The material for the coil pattern 33 and the terminal segments 33A and 33B may be, for example, a metal such as Cu, Fe, Zn, Al, Sn, Ni, Ti, Ag, Au, Pt, Pd, Ta, and W, or an alloy containing at least one of these metals. The magnetic material 34 is, for example, a ferrite.

The external electrodes 36A and 36B are located on the bottom surface M11. The external electrodes 36A and 36B are distant from each other in the width direction DW, extend along the longitudinal direction DL, and are arranged in parallel with each other.

The ratio of the concentration of the group 14 element to the concentration of the group 2 element in bottom dielectric regions R11A and R11B of the element body 32 near the bottom surface M11 and adjacent to the external electrodes 36A and 36B is higher than that in a top dielectric region R12 of the element body 32 near the top surface M12, and may be higher than that in a middle height dielectric region R13 between the bottom dielectric regions R11A and R11B and the top dielectric region R12. Accordingly, the toughness of the bottom dielectric regions R11A and R11B can be higher than that of the middle height dielectric region R13.

The ratio of the concentration of the group 14 element to the concentration of the group 2 element in the top dielectric region R12 may be lower than that in the middle height dielectric region R13. Accordingly, the hardness of the top dielectric region R12 can be higher than that of the middle height dielectric region R13.

In the above-described embodiments, the multilayer ceramic capacitors and the chip inductor are taken as examples as ceramic electronic components, but a ceramic electronic component according to the present invention may be a chip resistor or a sensor chip. In the above-described embodiments, each of the ceramic electronic components includes two external electrodes, but the ceramic electronic component may include three or more external electrodes.

In the above-described embodiments, the external electrodes are located only on the bottom surface M1 or M11 of the element body 2 or 32, but external electrodes may be located on multiple surfaces of an element body. In a case in which external electrodes are located on multiple surfaces of an element body, the ratio of the concentration of the group 14 element to the concentration of the group 2 element in regions near the external electrode may be higher than that in regions far from the external electrode. In this case, by using the above-described the method of manufacturing the ceramic electronic component, the ratio of the concentration of the group 14 element to the concentration of the group 2 element in regions near the external electrode can be increased by diffusion of the group 14 element from the base layer of the external electrode.

Experiments

The inventor conducted experiments for confirming suitable ratios of the concentration of a group 14 element to the concentration of a group 2 element in the left and right bottom dielectric regions R1A and R1B and suitable ratios in the top dielectric region R2. FIG. 7 shows results of the experiments.

For the experiments, the inventor prepared 1000 test pieces of each of specimens 1 to 6 of the multilayer ceramic capacitor 1 according to the first embodiment. Si was used as the group 14 element and Ba was used as the group 2 element. Specimens 1 to 6 have different ratios of the atomic concentration of Si to that of Ba in the regions R1A and R1B and different ratios of the atomic concentration of Si to that of Ba in the region R2. The atomic concentrations were measured with Energy Dispersive X-Ray Spectroscopy (EDS) used in conjunction with scanning electron microscopy (SEM).

In the experiments, a corner chipping test, a peeling test, and a capacitance density test were conducted for the test pieces. In the corner chipping test, it was searched whether or not at least one of the upper corners of the element body 2 of each test piece was chipped. In the peeling test, it was searched whether or not at least one of the external electrodes 6A and 6B was peeled off from the element body 2 for each test piece after mounting on a substrate. In the capacitance density test, the capacitance density of each test piece was measured.

Based on results of the corner chipping test, the peeling test, and the capacitance density test, the specimens were classified into good and bad.

For specimen 1, since the ratio of Si is low in the top dielectric region R2, the upper corners were sufficiently hard and were not chipped. However, since the ratio of Si is low in the left and right bottom dielectric regions R1A and R1B, the densification in, and thus the toughness of, the regions R1A and R1B were insufficient. Accordingly, in ten test pieces of specimen 1, at least one of the external electrodes 6A and 6B could not endure the stress when mounting on the substrate and was peeled off from the element body 2.

For specimen 2, since the ratio of Si is high in the top dielectric region R2, the upper corners were not sufficiently hard and were chipped. In addition, since the ratio of Si is low in the left and right bottom dielectric regions R1A and R1B, the densification in, and thus the toughness of, the regions R1A and R1B were insufficient. Accordingly, in ten test pieces of specimen 2, at least one of the external electrodes 6A and 6B could not endure the stress when mounting on the substrate and was peeled off from the element body 2.

For specimen 3, since the ratio of Si is high in the top dielectric region R2, the upper corners were not sufficiently hard and were chipped. However, since the ratio of Si is high in the left and right bottom dielectric regions R1A and R1B, the densification in, and thus the toughness of, the regions R1A and R1B were sufficient. Accordingly, in all the test pieces of specimen 3, the external electrodes 6A and 6B could endure the stress when mounting on the substrate and was not peeled off from the element body 2.

For specimen 4, since the ratio of Si is low in the top dielectric region R2, the upper corners were sufficiently hard and were not chipped. In addition, since the ratio of Si is high in the left and right bottom dielectric regions R1A and R1B, the densification in, and thus the toughness of, the regions R1A and R1B were sufficient. Accordingly, in all the test pieces of specimen 4, the external electrodes 6A and 6B could endure the stress when mounting on the substrate and was not peeled off from the element body 2. However, since the ratio of Si is too high in the left and right bottom dielectric regions R1A and R1B, the capacitance density was insufficient.

For specimens 5 and 6, since the ratio of Si is low in the top dielectric region R2, the upper corners were sufficiently hard and were not chipped. In addition, since the ratio of Si is high in the left and right bottom dielectric regions R1A and R1B, the densification in, and thus the toughness of, the regions R1A and R1B were sufficient. Accordingly, in all the test pieces of specimens 5 and 6, the external electrodes 6A and 6B could endure the stress when mounting on the substrate and was not peeled off from the element body 2. Furthermore, the capacitance density was sufficient.

From the results in FIG. 7, it can be seen that the ratio of the atomic concentration of Si to that of Ba in the left and right bottom dielectric regions R1A and R1B is preferably from 1.3% to 3.9%, and that the ratio of the atomic concentration of Si to that of Ba in the top dielectric region R2 is preferably from 0% to 1.0%.

FIG. 8A shows atomic concentrations of Si and Ba at different positions J1A, J1B, and J1C in the left and right bottom dielectric regions R1A and R1B of the element body 2 of another specimen. FIG. 8B shows atomic concentrations of Si and Ba at different positions J2A, J2B, and J2C in the top dielectric region R2 of the element body 2 of this specimen. The atomic concentrations were measured with EDS used in conjunction with SEM.

FIGS. 8A and 8B also show Si/Ba that is the ratio of the atomic concentration of Si to that of Ba in each position. As shown in FIGS. 8A and 8B, the ratio of the atomic concentration of Si to that of Ba at all positions in the regions R1A and R1B is higher than that at the ratio of the atomic concentration of Si to that of Ba at all positions in the region R2. It was confirmed that this specimen has a sufficient toughness in the entirety of the left and right bottom dielectric regions R1A and R1B.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A ceramic electronic component comprising:
an element body including at least one first internal electrode, at least one second internal electrode disposed in parallel to the first internal electrode, and a dielectric interposed between the first internal electrode and the second internal electrode and surrounding the first internal electrode and the second internal electrode, the element body having a bottom surface on which an end of the first internal electrode and an end of the second internal electrode are exposed and a top surface opposite to the bottom surface, the dielectric having bottom dielectric regions disposed adjacent to the bottom surface, a top dielectric region disposed adjacent to the top surface, and a middle height dielectric region disposed between the bottom dielectric regions and the top dielectric region;
a first external electrode electrically connected to the end of the first internal electrode; and
a second external electrode electrically connected to the end of the second internal electrode;
wherein the bottom dielectric regions include one or more of group 14 elements and one or more of group 2 elements, a ratio of a concentration of the one or more of group 14 elements to a concentration of the one or more of group 2 elements being higher in the bottom dielectric regions than in the top dielectric region,
wherein the one or more of group 2 elements is Ba, and the one or more of group 14 elements is Si, and
wherein the bottom dielectric regions have a ratio of an atomic concentration of Si to an atomic concentration of Ba that is equal to or greater than 1.3% and is equal to or less than 3.9%.

2. The ceramic electronic component according to claim 1, wherein the middle height dielectric region includes said one or more of group 14 elements and said one or more of group 2 elements, and the ratio of the concentration of the one or more of group 14 elements to the concentration of the one or more of group 2 elements is higher in the bottom dielectric regions than in the middle height dielectric region.

3. The ceramic electronic component according to claim 1, wherein the middle height dielectric region includes said one or more of group 14 elements and said one or more of group 2 elements, and the ratio of the concentration of the one or more of group 14 elements to the concentration of the one or more of group 2 elements is lower in the top dielectric region than in the middle height dielectric region.

4. The ceramic electronic component according to claim 1, wherein a toughness of the bottom dielectric regions is higher than a toughness of the middle height dielectric region.

5. The ceramic electronic component according to claim 1, wherein a hardness of the top dielectric region is higher than a hardness of the middle height dielectric region.

6. The ceramic electronic component according to claim 1, wherein the element body further has other surfaces connecting the bottom surface and the top surface, and upper corners formed by the other surfaces and the top surface, the top dielectric region containing the upper corners.

7. The ceramic electronic component according to claim 6, wherein the upper corners of the element body are chamfered.

8. The ceramic electronic component according to claim 1, wherein in the element body, the first internal electrode is provided in a plurality, the second internal electrode also is provided in a plurality, and the plurality of first internal electrodes and the plurality of second internal electrodes are alternately laminated in such a manner that the dielectric is interposed therebetween,
wherein the first external electrode extends along a direction in which the first and second internal electrodes are laminated,
wherein the second external electrode extends along the direction in which the first and second internal electrodes are laminated,
wherein each of the first internal electrodes has an exposed protrusion having a bottom end exposed only on the bottom surface of the element body, as said end of the first internal electrode, and
wherein each of the second internal electrodes has an exposed protrusion having a bottom end exposed only on the bottom surface of the element body, as said end of the second internal electrode.

9. The ceramic electronic component according to claim 1, wherein each of the first external electrode and the second external electrode includes a base layer and a plating layer formed on the base layer, the base layer containing metal, a co-material dispersed in the metal, and one or more of group 14 elements dispersed in the metal.

10. The ceramic electronic component according to claim 9, wherein each of the bottom dielectric regions includes a diffusion layer formed by diffusion of the one of more of group 14 elements in the base layer into the bottom dielectric region.

11. The ceramic electronic component according to claim 1, wherein the dielectric contains a ceramic material that includes at least one of barium titanate, strontium titanate, calcium titanate, magnesium titanate, barium strontium titanate, barium calcium titanate, calcium zirconate, barium zirconate, and calcium titanate zirconate.

12. The ceramic electronic component according to claim 1, wherein the one or more of group 2 elements are one or more of Be, Mg, Ca, Sr, and Ba, and the one or more of group 14 elements are one or more of C, Si, Ge, Sn, and Pb.

13. The ceramic electronic component according to claim 1, wherein the top dielectric region has a ratio of an atomic concentration of Si to an atomic concentration of Ba that is equal to or greater than 0% and is equal to or less than 1.0%.

14. An arrangement comprising:
the ceramic electronic component according to claim 1;
a mounting substrate;
a first land electrode formed on the mounting substrate;
a second land electrode formed on the mounting substrate;
a first solder layer connecting the first land electrode with the first external electrode; and
a second solder layer connecting the second land electrode with the second external electrode.

15. A method of manufacturing a ceramic electronic component, the method comprising:
forming an element body that includes at least one first internal electrode, at least one second internal electrode disposed in parallel to the first internal electrode, and a dielectric interposed between the first internal electrode and the second internal electrode and surrounding the first internal electrode and the second internal electrode, the dielectric including one or more of group 14 elements and one or more of group 2 elements, the element body having a bottom surface on which an end of the first internal electrode and an end of the second internal electrode are exposed and a top surface opposite to the bottom surface, the dielectric having bottom dielectric regions disposed adjacent to the bottom surface, a top dielectric region disposed adjacent to the top surface, and a middle height dielectric region disposed between the bottom dielectric regions and the top dielectric region, the forming of the element body including attaching a green sheet in which a ratio of the concentration of the one or more of group 14 elements to the concentration of the one or more of group 2 elements is lower than that in the middle height dielectric region to the top dielectric region;
applying a base material for base layers of external electrodes onto areas of the bottom surface on which the end of the first internal electrode and the end of the second internal electrode are respectively exposed, the base material containing metal and one or more of group 14 elements dispersed in the metal;
sintering the base material to form the base layers and to diffuse the one or more of group 14 elements contained in the base material into the bottom dielectric regions of the dielectric disposed adjacent to said areas of the bottom surface, such that after sintering, a ratio of a concentration of the one or more of group 14 elements to a concentration of the one or more of group 2 elements is lower in the top dielectric region than in the middle height dielectric region; and
forming plating layers on the base layers, respectively.

16. The method according to claim 15, wherein the one or more of group 2 elements is Ba, and the one or more of group 14 elements is Si.

* * * * *